(12) United States Patent
Roddy et al.

(10) Patent No.: US 6,354,245 B1
(45) Date of Patent: Mar. 12, 2002

(54) INFLATABLE PET CAGE

(76) Inventors: Kathleen K. Roddy; John F. Roddy, both of 421 Gibbons St., Alexandria, VA (US) 22314

( * ) Notice: Subject to any disclaimer, the term of this patent is extended or adjusted under 35 U.S.C. 154(b) by 0 days.

(21) Appl. No.: 09/558,290

(22) Filed: Apr. 25, 2000

Related U.S. Application Data

(60) Provisional application No. 60/132,209, filed on May 3, 1999.

(51) Int. Cl.$^7$ .......................... A01K 31/07; A01K 1/02; E04B 1/34
(52) U.S. Cl. .......................... 119/453; 119/482; 52/2.22
(58) Field of Search .................. 119/453, 474, 119/482, 496, 497, 498, 499; 52/2.11, 2.22; 5/706, 710; 446/220, 225

(56) References Cited

U.S. PATENT DOCUMENTS

| | | | | |
|---|---|---|---|---|
| 2,538,778 A | | 1/1951 | Halpin | |
| 2,830,606 A | * | 4/1958 | Daughtery | 119/498 |
| 3,982,500 A | * | 9/1976 | Marlatt | 119/482 |
| 4,893,586 A | * | 1/1990 | Carson | 119/482 |
| 5,007,212 A | | 4/1991 | Fritts et al. | |
| 5,078,096 A | | 1/1992 | Bishop et al. | |
| 5,487,400 A | | 1/1996 | Dawkins | |
| 5,636,478 A | | 6/1997 | Chen | |
| 5,660,197 A | | 8/1997 | Boe et al. | |
| 5,671,698 A | | 9/1997 | Farrugia | |
| 5,761,852 A | | 6/1998 | Liu | |
| 5,813,172 A | * | 10/1998 | McNally | 52/2.22 |
| 5,967,090 A | * | 10/1999 | Hui | 119/453 |
| 5,970,661 A | * | 10/1999 | Bishop et al. | 52/2.22 |

* cited by examiner

Primary Examiner—Charles T. Jordan
Assistant Examiner—Elizabeth Shaw
(74) Attorney, Agent, or Firm—Randall J. Knuth

(57) ABSTRACT

An inflatable pet cage, including a top member, a bottom member, and a plurality of inflatable wall members. The wall members have interior sides and exterior sides, with one of the inflatable wall members forming an entrance member.

8 Claims, 4 Drawing Sheets

INFLATABLE PET CAGE

This Application claims benefit to Provisional Application No. 60/132,209 filed May 3, 1999.

BACKGROUND OF THE INVENTION

1. Field of the Invention

The present invention relates to pet cages and more particularly to an inflatable pet cage which includes side walls which conform to the shape of their surroundings.

2. Description of the Related Art

Pet cages and carriers of various size and shape exist. A common example is the pet transport cages which are used by common carriers such as airlines. These pet transport containers are generally rectangular in shape and are usually formed from rigid plastic. These pet carriers/cages are generally formed of two parts, a top and a bottom, which may be separated about the middle circumference. The two parts of these carriers are fastened together by fastening devices at intervals about their periphery. The door of the carriers is normally made of rigid wire crossed bars and the sides and/or rear walls may have openings with crossed bars for ventilation. These carriers are designed to provide protection for the pet and to prevent any damage to the carrier and consequently the pet contained therein. These carriers may include a carrying handle. Owing to their rigid construction, these containers cannot conform to different surroundings and occupy a large space.

Other currently existing carriers include designs which appear as large utility or tote bags. These pet carriers are formed from light weight material attached to a rigid frame structure. The rigid frame structure of these containers prevents these containers from conforming to their surroundings. Additionally, the light weight material used in forming these carriers does not provide much comfort or protection to the animal contained within.

Additional pet carriers/cages known in the art include many collapsible type pet carriers/cages which have rigid walls which are collapsible. Pet cages of this type are bulky and heavy to carry. Owing to their rigid construction, these containers cannot conform to different surroundings and occupy a large space.

What is needed in the art is a collapsible pet cage/carrier which is light weight and easy to transport, which can conform to different surroundings and which provides adequate protection and comfort to a pet.

SUMMARY OF THE INVENTION

The present invention is directed to improve upon the aforementioned pet cage/carriers wherein it is desired to provide a pet cage which is collapsible, is light weight and easy to carry, which can conform to different surroundings and which provides comfort and protection to a pet.

The present invention comprises a pet cage which is formed from inflatable walls.

The inflatable pet cage includes a housing having rigid top and bottom panels attached to inflatable side panels. The top and bottom panels allow the housing to be stable when the cage is inflated and in use and provide for protection and encapsulation of the side panels when the cage is deflated to form a "suitcase" configuration. Handles are provided on one side of the top and bottom panel for carrying purposes.

The side panels are inflatable, readily allowing the suitcase to be passed through a smaller opening such as a car door or in between seats prior to inflating the cage to its full dimensions. The sides of the cage are comprised of baffled inflatable compartments protected by an overlay of protective fabric to prevent puncture. The flexible sides also allow the cage to conform to cramped spaces in which a rigid shape would not fit. When compressed into its suitcase configuration the cage can be easily stored and transported.

Light and ventilation are provided by wire mesh panels encapsulated in the upper portions of the cage sides. Access is provided through a zipping flap on one end. The cage can be secured inside a car by passing the seat belts through the restraining loops in the cage's side and bottom and anchoring them. The cage is inflated through an air valve on either end. The cage is deflated by opening the air valves, allowing some air to escape, interlocking the hinges on the side opposite the handles, and compressing the cage. This forces the air out as a bellows would and allows the top to be secured by latches passing through the restraining loops. The cage then resembles a suitcase and can be stored or carried as such.

The invention, in one form thereof, comprises an inflatable pet cage which includes a top member, a bottom member and a plurality of inflatable wall members. The inflatable wall members have interior sides and exterior sides, and a plurality of sections of protected fabric may be provided to cover the interior sides of these wall members. The protective fabric utilized is a material which is light weight and which is not susceptible to puncture.

The invention, in another form thereof, comprises an inflatable pet cage. In this form, the inflatable pet cage includes a top member which is rigid in construction and which has a first side and a second side. The inflatable pet cage further includes a bottom member which is rigid in construction and which has a first side and a second side. In one form of the invention, the inflatable pet cage includes an interlocking hinge member which includes a first interlocking member and a complementary interlocking hinge member. The first interlocking hinge member and the complementary interlocking hinge member are selectively rotatably engagable. The first interlocking hinge member is affixed to the first side of the top member and the complementary interlocking hinge member is affixed to the first side of the bottom member.

In one form of the current invention, the inflatable pet cage includes a pair of carrying handles. One of the pair of carrying handles is affixed to the second side of the top member while the other of the pair of carrying handles is affixed to the second side of the bottom member. The inflatable pet cage of the current invention further includes an end member which is selectively inflatable and selectively collapsible. The end member includes baffles which assist in the inflation of the end member. The end member is fixedly attached to the top member and to the bottom member. The inflatable pet cage further includes a pair of side members which are selectively inflatable and selectively collapsible. The side members also include baffles which assist in the inflation of the side members. The side members are fixedly attached to the top member and to the bottom member.

In one form of the current invention, a first air valve is connected to the end member. The first air valve is in fluid communication with the end member baffles and the side member baffles. The first air valve is selectively actuatable between an open and a closed position.

The inflatable pet cage of the current invention further includes an entrance member which is selectively inflatable and selectively collapsible. The entrance member includes baffles which assist in the inflation of the entrance member and which are in fluid communication with the first air valve. The entrance member is fixedly attached to the top member and to the bottom member. The entrance member has a hole which defines an entrance passage.

In one form of the current invention, a second air valve is provided which is connected to the entrance member. The entrance member baffles, end member baffles and side member baffles are all in fluid communication with the second air valve. The second air valve is selectively actuatable between an open and a closed position.

The inflatable pet cage of the current invention further includes an entry flap formed from a protective fabric, which entry flap has a base. The entry flap base is fixedly attached to the entrance passage. The protective fabric which forms the entry flap is a fabric material which resists puncture. A zipper is attached to the entry flap and to the entrance member, whereby closing the zipper closes the hole which forms the entrance passage.

In one form of the current invention, a wire mesh window is provided. The wire mesh window may be disposed within either of the pair of side members which form the inflatable pet cage.

An advantage of the present invention is the ability to provide a pet cage which is small, light weight and portable, and which can conform to cramped spaces in which the cage may be placed.

Another advantage of the present invention is the ability to provide a small, light weight and collapsible pet cage which provides protection and comfort to the pet by utilizing inflatable walls which are not susceptible to puncture.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
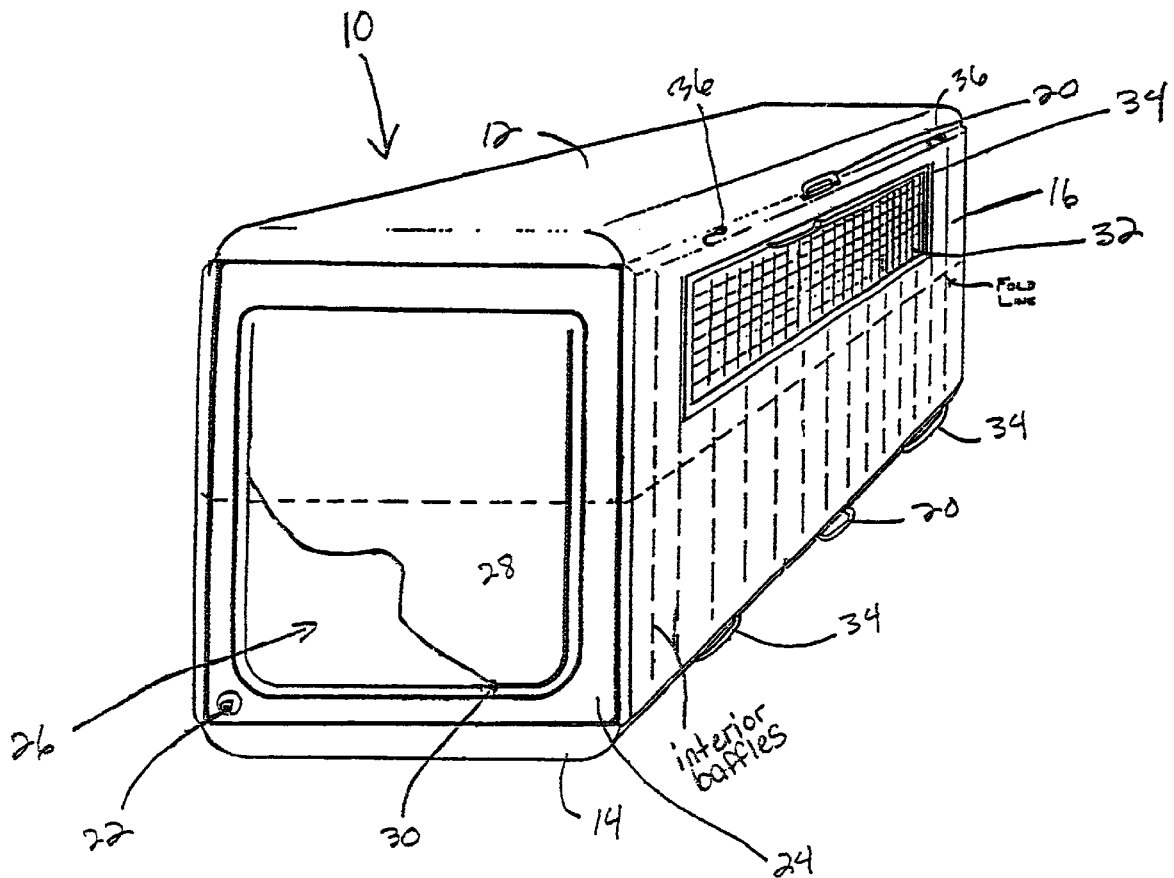
FIG. 1 is a perspective view of the inflatable pet cage of the current invention.

Referring now to the drawings and particularly to FIG. 1, there is shown an inflatable pet cage 10. Inflatable pet cage 10 includes rigid top and bottom members 12, 14 and side members 16. Side members 16 are selectively inflatable.

Figure 2:
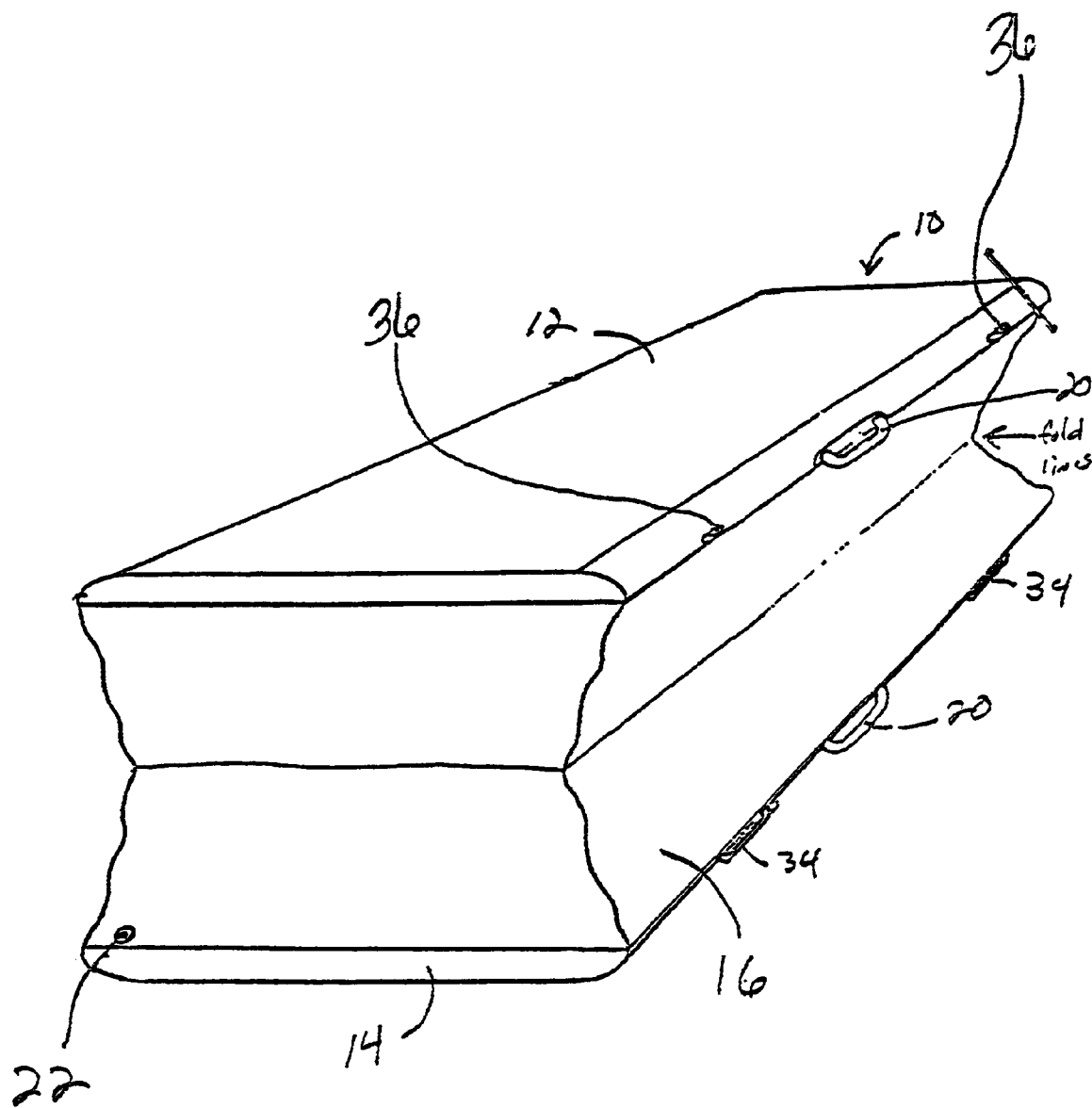
FIG. 2 is a perspective view of the inflatable pet cage of the current invention in a partially collapsed position in which the interlocking hinges are not engaged.

FIG. 2 illustrates inflatable pet cage 10 in a partially collapsed position. As illustrated, the walls of inflatable pet cage 10 have fold lines to ease the transition from the inflated position of the pet cage to the deflated position.

Figure 3:
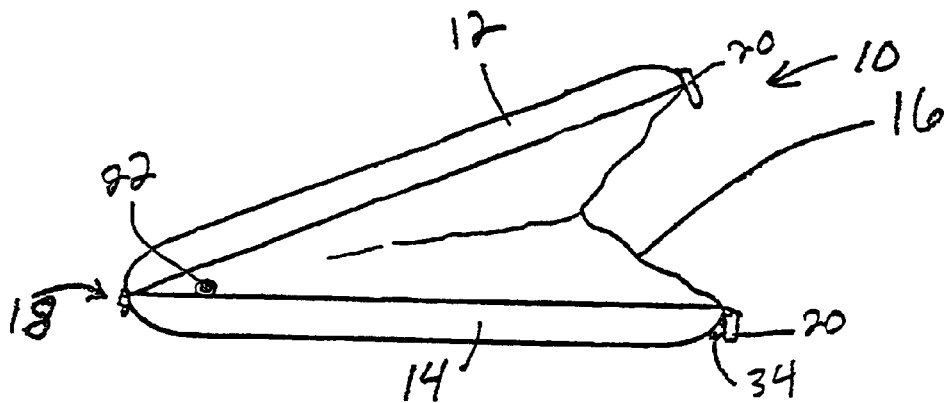
FIG. 3 is an end elevational view of the inflatable pet cage of the current invention.
Figure 4:
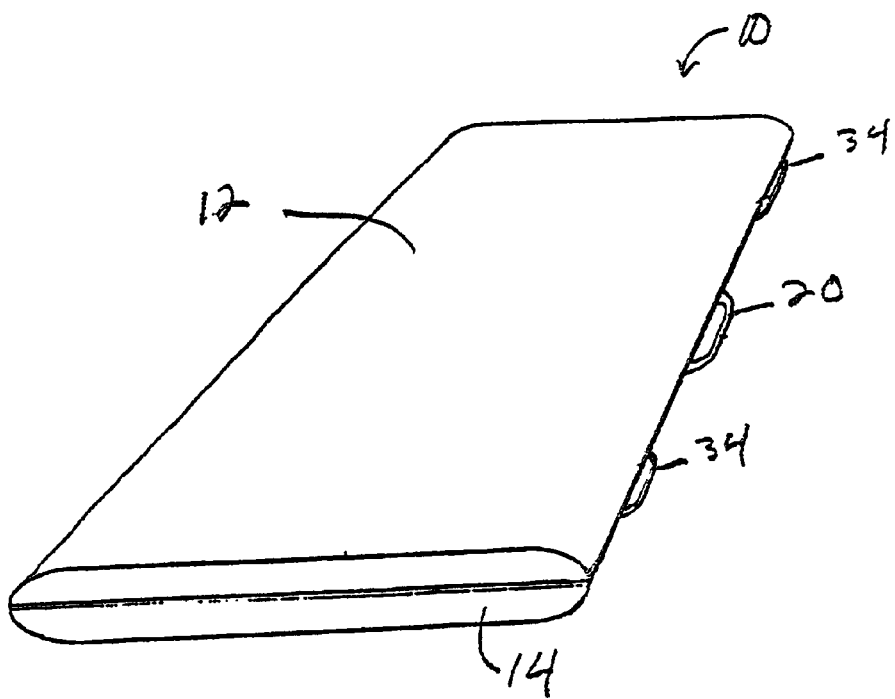
FIG. 4 is a perspective view of the inflatable pet cage of the current invention in its collapsed form.

As illustrated in FIG. 3, a first interlocking hinge member is affixed to an end of top member 12. A complementary interlocking hinge member is affixed to bottom member 14. The first interlocking hinge member and the complementary interlocking hinge member are selectively rotatably engagable to form interlocking hinge member 18. In this way, interlocking hinge member 18 can be rotatably engaged and the opposing ends of top member 12 and bottom member 14 may be brought together in an effort to expel the air from the inflatable walls of inflatable pet cage 10. FIG. 4 illustrates inflatable pet cage 10 in its fully closed position.

Referring now to FIG. 1, air valve 22 is connected to entrance member 24 and is in fluid communication with interior baffles which form a part of entrance member 24, side members 16, and the end member (not shown). As illustrated, entrance member 24 includes a hole which forms entrance passage 26. Entry flap 28 has a base which is fixedly attached to entrance member 24. Wire mesh window 32 is disposed within side member 16. Carrying handles 20 are affixed to both top member 12 and bottom member 14 and allow for ease in carrying the inflatable pet cage in its collapsed configuration. Closure latches 36 may be actuated to engage seat belt retaining loops 34 and retain inflatable pet cage 10 in its closed position upon deflation of the inflatable walls. Seat belt retaining loops 34 additionally may be utilized to anchor inflatable pet cage 10 in the seat of an automobile.

Figure 5:
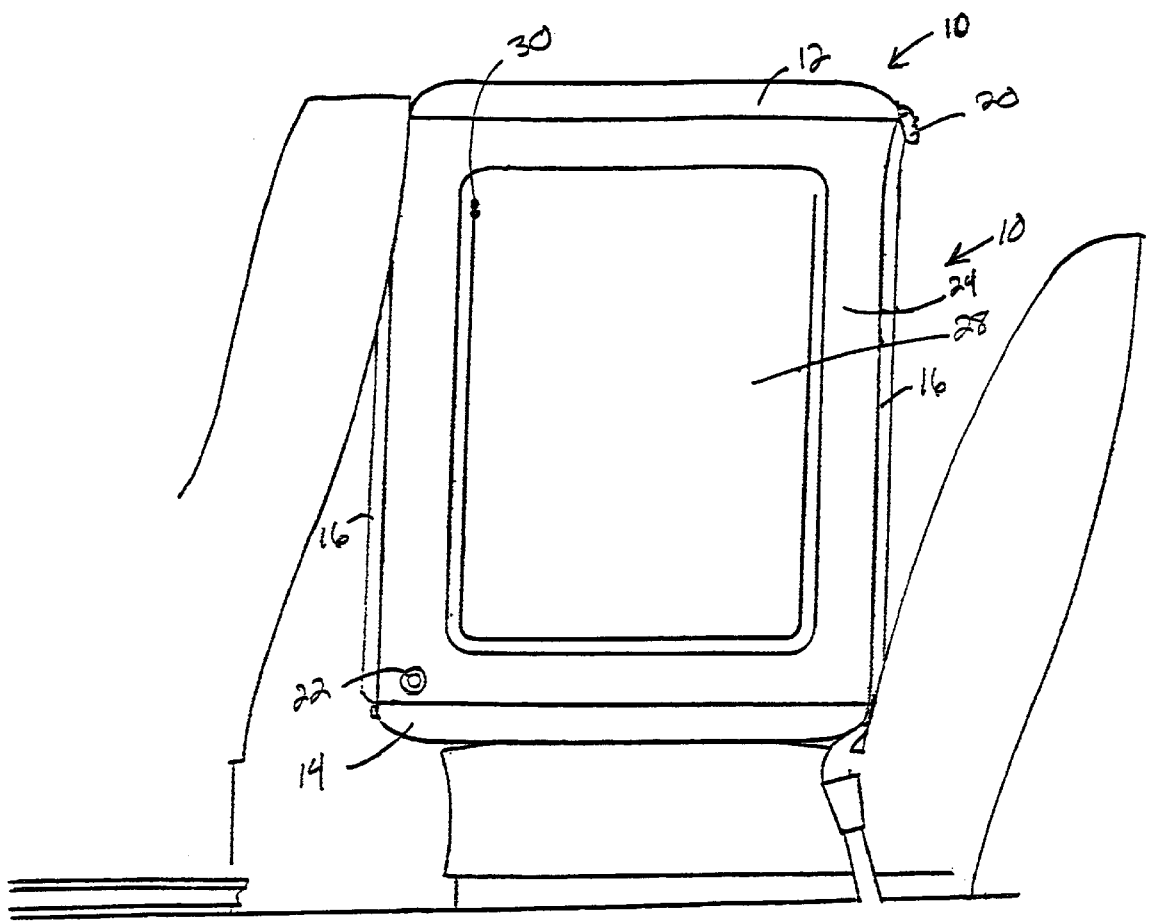
FIG. 5 is an end elevational view of the inflatable pet cage of the current invention shown installed in the back seat of a car.

As illustrated in FIG. 5, inflatable pet cage 10 may be placed in an automobile back seat and inflated. Since inflatable side members 16 are not rigid, they will conform to the configuration of the seat in which inflatable pet cage 10 is placed. Zipper 30 may then be actuated to allow entry flap 28 to be moved and access to entrance passage 26 obtained. The inflatable pet cage may be easily loaded into a vehicle prior to inflation, anchored to the seat utilizing seat belt retaining loops 34, and be subsequently inflated. In this way, inflatable pet cage 10 can provide a safe and comfortable environment for a pet during travel while eliminating pet mess in the automobile.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An inflatable pet cage, comprising:
   a rigid top member;
   a rigid bottom member; and
   a plurality of inflatable wall members, said wall members having interior sides and exterior sides, said wall member permanently attached to said top and bottom members one of said plurality of inflatable wall members forming an entrance member, said wall members storable between said top and bottom members.

2. The inflatable pet cage as recited in claim 1, further comprising:
   a plurality of sections of protective fabric, said sections of protective fabric covering said interior sides of said wall members, wherein said protective fabric is not susceptible to puncture.

3. The pet cage of claim 1 further including a belt retaining loops for connection to automobile seatbelts.

4. An inflatable pet cage, comprising:
   a top member, said top member being rigid in construction, said top member having a first side and a second side;
   a bottom member, said bottom member being rigid in construction, said bottom member having a first side and a second side;
   an interlocking hinge member, said interlocking hinge member comprising a first interlocking hinge member and a complementary interlocking hinge member, said first interlocking hinge member and said complementary interlocking hinge member being selectively rotatably engagable, said first interlocking hinge member affixed to said first side of said top member, said complementary interlocking hinge member affixed to said first side of said bottom member;
   a pair of carrying handles, one of said pair of carrying handles affixed to said second side of said top member, the other of said pair of carrying handles affixed to said second side of said bottom member;
   an end member, said end member being selectively inflatable, said end member being selectively collapsible, said end member including baffles which assist inflation of said end member, said end member fixedly attached to said top member, said end member fixedly attached to said bottom member;
   a pair of side members, said side members being selectively inflatable, said side members being selectively collapsible, said side members including baffles which assist inflation of said side members, said side members fixedly attached to said top member, said side members fixedly attached to said bottom member;
   a first air valve, said first air valve connected to said end member, said end member baffles and said side member baffles in fluid communication with said first air valve, said first air valve being selectively actuatable between an open and a closed position;
   an entrance member, said entrance member being selectively inflatable, said entrance member being selectively collapsible, said entrance member including baffles which assist inflation of said entrance member, said entrance member baffles in fluid communication with said first air valve, said entrance member fixedly attached to said top member, said entrance member fixedly attached to said bottom member, said entrance member having an entrance passage;
   a second air valve, said second air valve connected to said entrance member, said entrance member baffles, said end member baffles and said side member baffles in fluid communication with said second air valve, said second air valve being selectively actuatable between an open and a closed position;
   an entry flap, said entry flap having a base, said entry flap base fixedly attached to said entrance passage, said entry flap formed from protective fabric, whereby said protective fabric resists puncture;
   a zipper, said zipper attached to said entry flap and to said entrance member, whereby closing said zipper closes said entrance passage; and
   a wire mesh window, said wire mesh window disposed within one of said pair of side members.

5. An inflatable pet cage comprising:
   a rigid top member;
   a rigid bottom member;
   a plurality of inflatable wall members, said wall members having interior sides and exterior sides, one of said plurality of inflatable wall members forming an entrance member said wall member storable between said top and bottom members; and
   an interlocking hinge member, said hinge member comprising a first interlocking hinge member and complementary interlocking hinge member, said first interlocking hinge member and said complementary interlocking hinge member being selectively rotatably engagable, said first interlocking hinge member affixed to said top member, said complementary interlocking hinge member affixed to said bottom member.

6. The pet cage of claim 5 further including a belt retaining loops for connection to automobile seatbelts.

7. An inflatable pet cage comprising:
   a rigid top member;
   a rigid bottom member;
   a plurality of inflatable wall members, said wall members having interior sides and exterior sides, one of said plurality of inflatable wall members forming an entrance member said wall member storable between said top and bottom members; and
   said plurality of inflatable wall members together creating a sealable escape-proof enclosure.

8. The pet cage of claim 7 further including a belt retaining loops for connection to automobile seatbelts.

* * * * *